United States Patent
Ni et al.

(10) Patent No.: US 8,792,028 B2
(45) Date of Patent: Jul. 29, 2014

(54) IMAGE SENSOR APPARATUS AND METHOD FOR LINE BUFFER EFFICIENT LENS DISTORTION CORRECTION

(75) Inventors: Yongshen Ni, Santa Clara, CA (US); Jizhang Shan, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 469 days.

(21) Appl. No.: 13/141,053

(22) PCT Filed: Dec. 18, 2008

(86) PCT No.: PCT/US2008/087395
§ 371 (c)(1),
(2), (4) Date: Nov. 8, 2011

(87) PCT Pub. No.: WO2010/071647
PCT Pub. Date: Jun. 24, 2010

(65) Prior Publication Data
US 2012/0044391 A1     Feb. 23, 2012

(51) Int. Cl.
*H04N 5/335*     (2011.01)
(52) U.S. Cl.
USPC .......................................... 348/273; 348/335
(58) Field of Classification Search
CPC ................................ H04N 5/217; H04N 5/243
USPC .......................... 348/241, 335, 272, 273, 252
See application file for complete search history.

(56) References Cited

U.S. PATENT DOCUMENTS

| | | | |
|---|---|---|---|
| 7,573,515 B2 * | 8/2009 | Jaspers | 348/272 |
| 2005/0213159 A1 | 9/2005 | Okada et al. | |
| 2005/0285956 A1 * | 12/2005 | Wagner et al. | 348/272 |
| 2006/0268357 A1 | 11/2006 | Vook et al. | |
| 2008/0136943 A1 | 6/2008 | Azuma | |

FOREIGN PATENT DOCUMENTS

| | | |
|---|---|---|
| JP | 200563154 | 3/2005 |
| JP | 2007163461 | 6/2007 |

OTHER PUBLICATIONS

International Search Report and Written Opinion issued in related PCT Patent Application Serial No. PCT/US2008/087395, issued Mar. 31, 2009, 6 pages.
International Preliminary Report on Patentability issued in related PCT Patent Application Serial No. PCT/US2008/087395, issued Jun. 21, 2011, 5 pages.
Office Action issued in Chinese Patent Application 200880132805.4 dated Jun. 18, 2013, 8 pages.
Office Action issued in Chinese Patent Application 200880132805.4 dated Jan. 6, 2014, 8 pages.

\* cited by examiner

*Primary Examiner* — Tuan Ho
(74) *Attorney, Agent, or Firm* — Lathrop & Gage LLP

(57) ABSTRACT

An image sensor apparatus is disclosed. The image sensor apparatus includes an image sensor for generating image data corresponding to an optical image. The image sensor apparatus also includes a color filter customized for a lens distortion model. A processor processes the image data with a plurality of distortion correction routines to generate a digital image.

16 Claims, 9 Drawing Sheets

Original Image

Distorted Image

Original Image

Distorted Image

IMAGE SENSOR APPARATUS AND METHOD FOR LINE BUFFER EFFICIENT LENS DISTORTION CORRECTION

BRIEF DESCRIPTION OF THE INVENTION

This invention relates generally to lens distortion errors in images captured with image sensors. More particularly, this invention relates to techniques for correcting lens distortion in digital images at capture time without requiring a large number of line buffers.

BACKGROUND OF THE INVENTION

Image sensors are semiconductor devices that capture and process light into electronic signals for forming still images or video. Their use has become prevalent in a variety of consumer, industrial, and scientific applications, including digital cameras and camcorders, hand-held mobile devices, webcams, medical applications, automotive applications, games and toys, security and surveillance, pattern recognition, and automated inspection, among others. The technology used to manufacture image sensors has continued to advance at a rapid pace.

There are two main types of image sensors available today: Charge-Coupled Device ("CCD") sensors and Complementary Metal Oxide Semiconductor ("CMOS") sensors. In either type of image sensor, a light gathering photosite is formed on a semiconductor substrate and arranged in a two-dimensional array. The photosites, generally referred to as picture elements or "pixels," convert the incoming light into an electrical charge. The number, size, and spacing of the pixels determine the resolution of the images generated by the sensor.

Modern image sensors typically contain millions of pixels in the pixel array to provide high-resolution images. To capture color images, each pixel is covered with a color filter, an optical element that only allows penetration of a particular color within given wavelengths of light. A color filter array ("CFA") is built on top of the pixel array for separating color information for each pixel. The most popular type of CFA is called a "Bayer array", composed of alternating rows of Red-Green and Green-Blue filters. The Bayer array has twice as many Green filters as Blue or Red filters to account for the Human Visual System peak sensitivity to the green portion of the light spectrum. The image information captured in each pixel, e.g., raw pixel data in the Red, Green, and Blue ("RGB") color space, is transmitted to an Image Signal Processor ("ISP") or other Digital Signal Processor ("DSP") where it is processed to generate a digital image.

The quality of the digital images generated by an image sensor device depends mostly on its sensitivity and a host of other factors, such as lens-related factors (distortion, flare, chromatic aberration, depth of field), signal processing factors, time and motion factors, semiconductor-related factors (dark currents, blooming, and pixel defects), and system control-related factors (focusing and exposure error, white balance error). In particular, lens distortion may significantly affect the quality of the digital images.

Lens distortion is an optical aberration that occurs when the object being imaged is not situated on the optical axis of the lens. The result is an error between the digital image coordinates and the object coordinates. Among various types of lens distortions, radial distortion along a radial line from the optical center of the digital image is one of the most common and severe.

Digital images with radial distortion have distorted lines that are bent away and/or toward the center of the image, as illustrated in FIGS. 1A-B. In FIG. 1A, the distorted image 105 appears to have a spherical or barrel shape with lines bent away from the center of the image as image magnification decreases with increasing distance from the optical center. This type of radial distortion is commonly referred to as "barrel" distortion. Barrel distortion is associated with wide-angle lenses (e.g., fisheye lenses) and typically occurs at the wide end of a zoom lens. Wide-angle lenses have become popular in many image sensor devices and applications, such as, for example, in automobile back-up cameras and in medical devices.

The distorted image 115 shown in FIG. 1B has the opposite effect, with lines bent toward the center of the image as image magnification increases with increasing distance from the optical center. This image is said to have "pincushion" distortion as its lines appear to be pinched at the center. Pincushion distortion is associated with telephoto lenses and typically occurs at the telescope end of a zoom lens.

Another type of radial distortion is moustache distortion, which is a mixture of barrel distortion (at the center of the image) and pincushion distortion (on the periphery of the image). Moustache distortion may be observed on retrofocus lenses or large-angle zoom lenses.

All three of these radial distortion types can introduce significant errors in the digital images and must be corrected for. Existing approaches to correct for lens distortion in digital images range from post-processing techniques applied to the digital images themselves to techniques used in the image sensor devices before the digital images are generated. Post-processing techniques are widely available in software packages and solutions such as Adobe® Photoshop®, developed by Adobe® Systems Inc., of San Jose, Calif. However, they are not suitable for real-time applications requiring distortion-free or close to distortion-free images such as medical, surveillance, and navigation applications.

In this case, processing techniques can be used in the image sensor devices at capture time before the digital images are generated. These techniques include the use of distortion models that estimate the distortion in the digital images based on model parameters that are derived during lens calibration. The calibration process uses a known test pattern or image to determine the extent of the distortion introduced by the lens. The distortion is modeled with a mathematical function, such as a $n^{th}$-order polynomial, that is then applied to the distorted image to correct its coordinates.

For example, let the coordinate of a given pixel in a distorted image be (x,y). The pixel (x,y) is mapped to a coordinate (x',y') in a corrected image according to a mathematical function $f$, that is, $(x',y')=f(x,y,c)$, where c denotes distortion parameters determined during lens calibration. Typically, both horizontal and vertical coordinates are mapped together, that is, the model corrects for both horizontal and vertical lens distortion simultaneously. A given set of distortion parameters c may be stored in the image sensor device and applied for a number of lenses within a lens family. The goal is for the corrected image to be as distortion free as possible.

In practice, applying a distortion model in an image sensor device may require a large number of line buffers to store the coordinates of distorted lines before the model is applied. The line buffers are small, temporary storage locations used to store a line or part of a line of image data. Depending on the lens, a large number of line buffers may be required to store neighboring lines before a new coordinate in a corrected image may be determined by the lens' distortion model. For example, the Sunex DSL215 lens, developed by Sunex, Inc., of Carlsbad, Calif., may require around 70 line buffers to apply its distortion model and generate corrected images. Such requirements increase power consumption, die size, and system cost of image sensor devices.

Accordingly, it would be desirable to provide an image sensor apparatus and method for correcting lens distortion in digital images at capture time without requiring a large number of line buffers.

SUMMARY OF THE INVENTION

An image sensor apparatus has an image sensor for generating image data corresponding to an optical image and a color filter array customized for a lens distortion model. A processor processes the image data with a plurality of distortion correction routines to generate a digital image.

An embodiment of the invention includes a method for correcting lens distortion in a digital image. A distortion model is generated for an optical lens. A color filter array is designed according to the distortion model. Image data is acquired with an image sensor apparatus having the designed color filter array. A plurality of distortion correction routines are applied to the image data to generate a digital image.

Another embodiment of the invention includes a processor for use in an image sensor apparatus having a color filter array associated with a read out data path. A distortion estimation module generates a lens distortion model for an optical lens, the lens distortion model comprising a vertical distortion model and an horizontal distortion model. A distortion correction module corrects for horizontal lens distortion according to the horizontal distortion model. The color filter array and the read out data path are customized according to the vertical distortion model.

BRIEF DESCRIPTION OF THE DRAWINGS

The invention is more fully appreciated in connection with the following detailed description taken in conjunction with the accompanying drawings, in which like reference characters refer to like parts throughout, and in which.

DETAILED DESCRIPTION OF THE INVENTION

An image sensor apparatus for correcting lens distortion in digital images at capture time is provided. As generally used herein, lens distortion refers to an aberration introduced by an optical lens system (i.e., having one or more optical lenses) that results in distorted images. The distorted images may have its lines bent away from the center (barrel distortion), bent toward the center (pincushion distortion), or a combination of both (moustache distortion).

According to an embodiment of the invention, lens distortion is corrected for at capture time by capturing image data with an image sensor and an optical lens and applying a distortion model associated with the lens to generate a distortion-corrected digital image. The distortion model is generated during lens calibration by capturing image data for a test image and characterizing the distortion in the generated image. The optical lens may include an ultra-wide angle lens, a fisheye lens, a telephoto lens, a retrofocus lens, a large-angle zoom lens, or any other lens that may be coupled to an image sensor.

In one embodiment, the distortion model is decomposed into a vertical distortion model and a horizontal distortion model. The vertical distortion model is automatically applied by using a custom designed color filter array coupled to the image sensor. The color filter array is customized after lens calibration to reroute the image data path and correct for vertical distortion according to the vertical distortion model. Doing so significantly reduces or completely eliminates the number of line buffers traditionally required by prior art distortion correction techniques.

The horizontal distortion model is then applied to the rerouted image data to generate a distortion-corrected digital image. In one embodiment, an anti-alias filter may also be used to reduce distortion artifacts around the edges of the image.

Figure 1A:
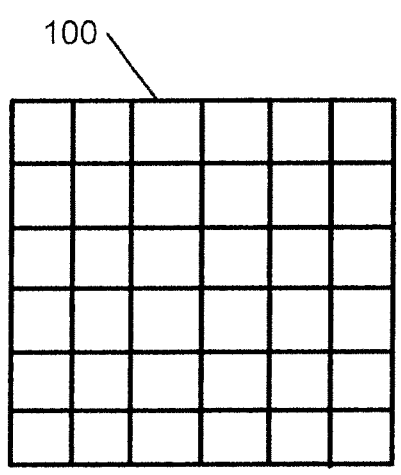
FIGS. 1A-B illustrate an original image and a distorted image.
Figure 1A:
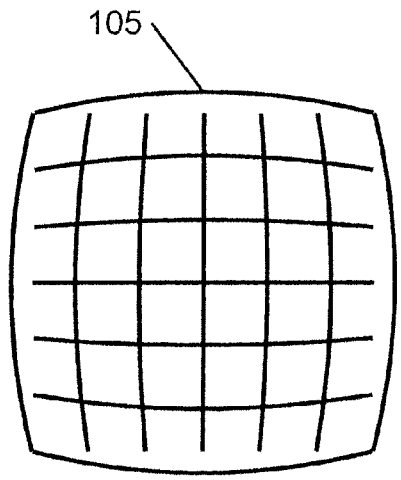
Figure 1B:
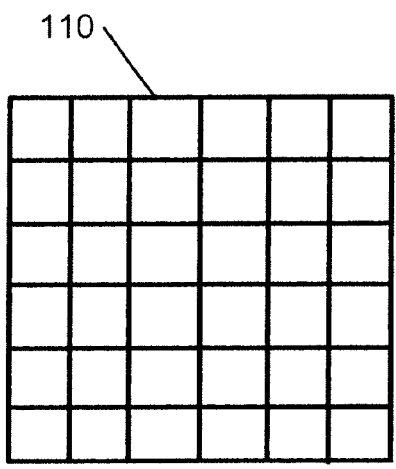
Figure 1B:
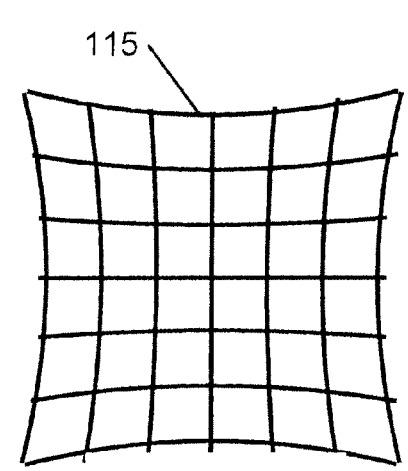
Figure 2:
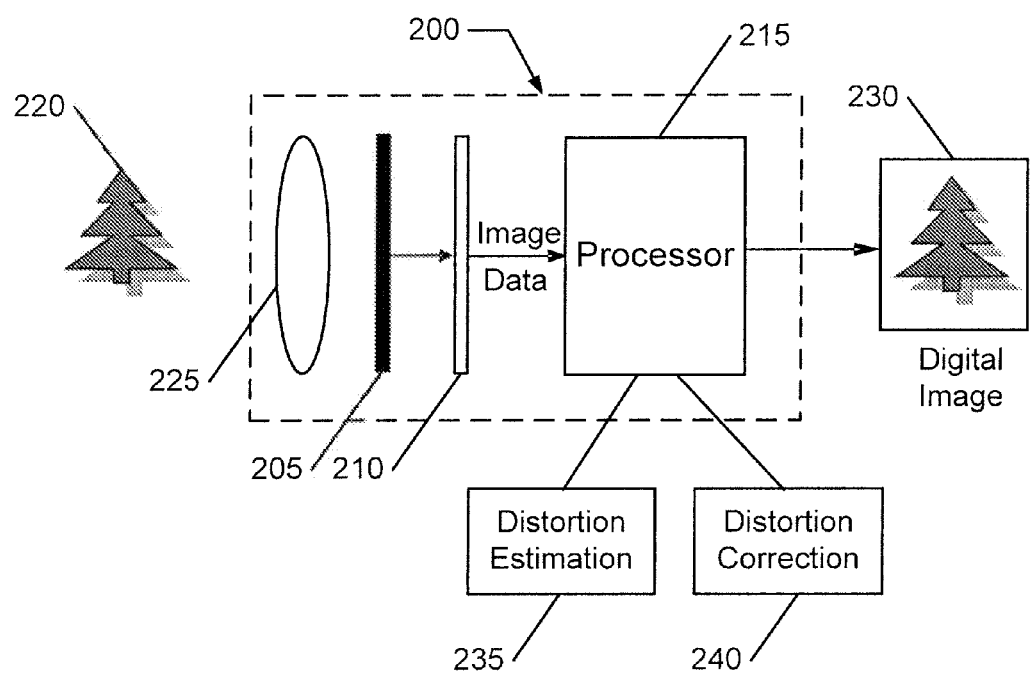
FIG. 2 illustrates an image sensor apparatus constructed in accordance with an embodiment of the invention.

FIG. 2 illustrates an image sensor apparatus constructed in accordance with an embodiment of the invention. Image sensor apparatus 200 includes image sensor 205, color filter array 210, and processor 215. Light reflected from object 220 passes through optical lens 225 onto image sensor 205 and color filter array 210 and is converted into image data. The image data is then processed by processor 215 to generate digital image 230. Optical lens 225 may create lens distortion in digital image 230 as compared to the scene coordinates of object 220.

According to an embodiment of the invention, processor 215 includes a distortion estimation module 235 and a distortion correction module 240. Distortion estimation module 235 includes routines for generating a lens distortion model for optical lens 225 during lens calibration and decomposing the lens distortion model into a horizontal distortion model and a vertical distortion model. Distortion correction module 240 includes routines for correcting for horizontal lens distortion in digital image 230 according to the horizontal distortion model.

As described in more detail herein below, color filter array 210 is a custom designed color filter array that automatically corrects for vertical lens distortion according to the vertical distortion model. In one embodiment, this is accomplished by modifying a standard (e.g., Bayer or other type) color filter array to reroute the image data to follow the vertical distortion model and compensate for vertical distortion while the image data is being captured by the array. Curve compensation may be further performed to fine-tune the rerouted image data to the vertical distortion model.

It is appreciated by one of ordinary skill in the art that optical lens 225 may be integrated into image sensor apparatus 200 or it may be a separate lens coupled to image sensor apparatus 200. It is also appreciated that the use of a custom designed color filter array significantly reduce or completely eliminate the number of line buffers traditionally required by prior art distortion correction techniques.

Figure 3:
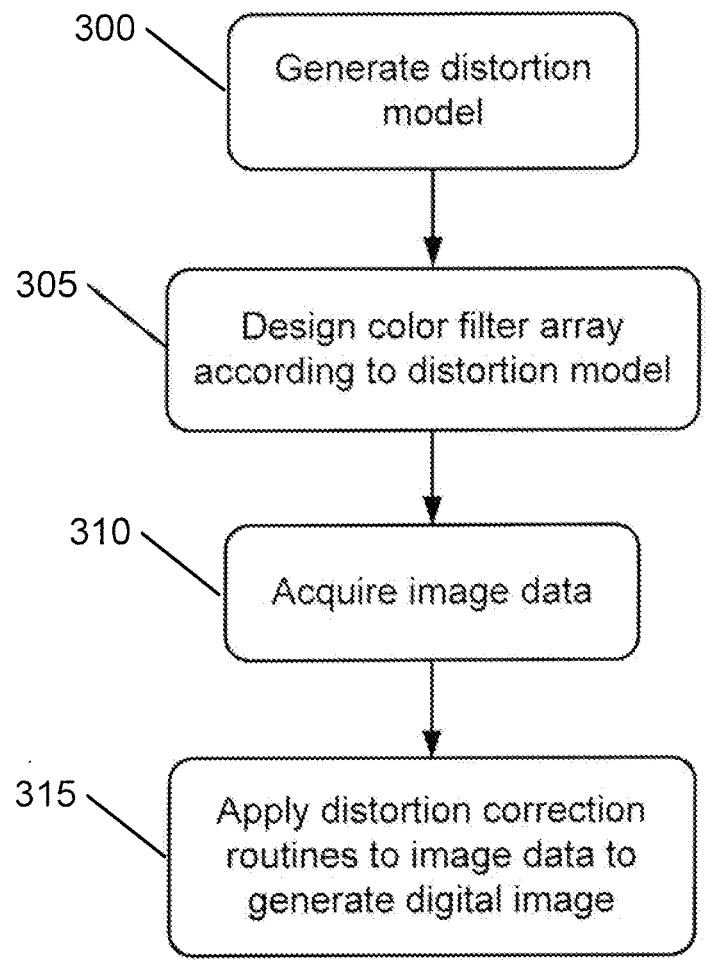
FIG. 3 illustrates a flow chart for correcting lens distortion in a digital image in accordance with an embodiment of the invention.

Referring now to FIG. 3, a flow chart for correcting lens distortion in a digital image in accordance with an embodiment of the invention is described. First, a lens distortion model is generated (300). As described in more detail herein above, the lens distortion model is generated during lens calibration of lens 225 and decomposed into a vertical distortion model and a horizontal distortion model. Next, as described in more detail herein below with reference to FIGS. 6A-C, color filter array 210 is designed according to the vertical distortion model (305). In one embodiment, this is accomplished by modifying a standard (e.g., Bayer or other type) color filter array to reroute the image data to follow the vertical distortion model.

Image data is then acquired with image sensor 205 and color filter array 210 and sent to processor 215 (310). Lastly, processor 215 applies distortion correction routines to the image data to generate a distortion-corrected digital image (315). As described in more detail herein below, the distortion correction routines correct for horizontal lens distortion in the digital image according to the horizontal distortion model.

Figure 4:
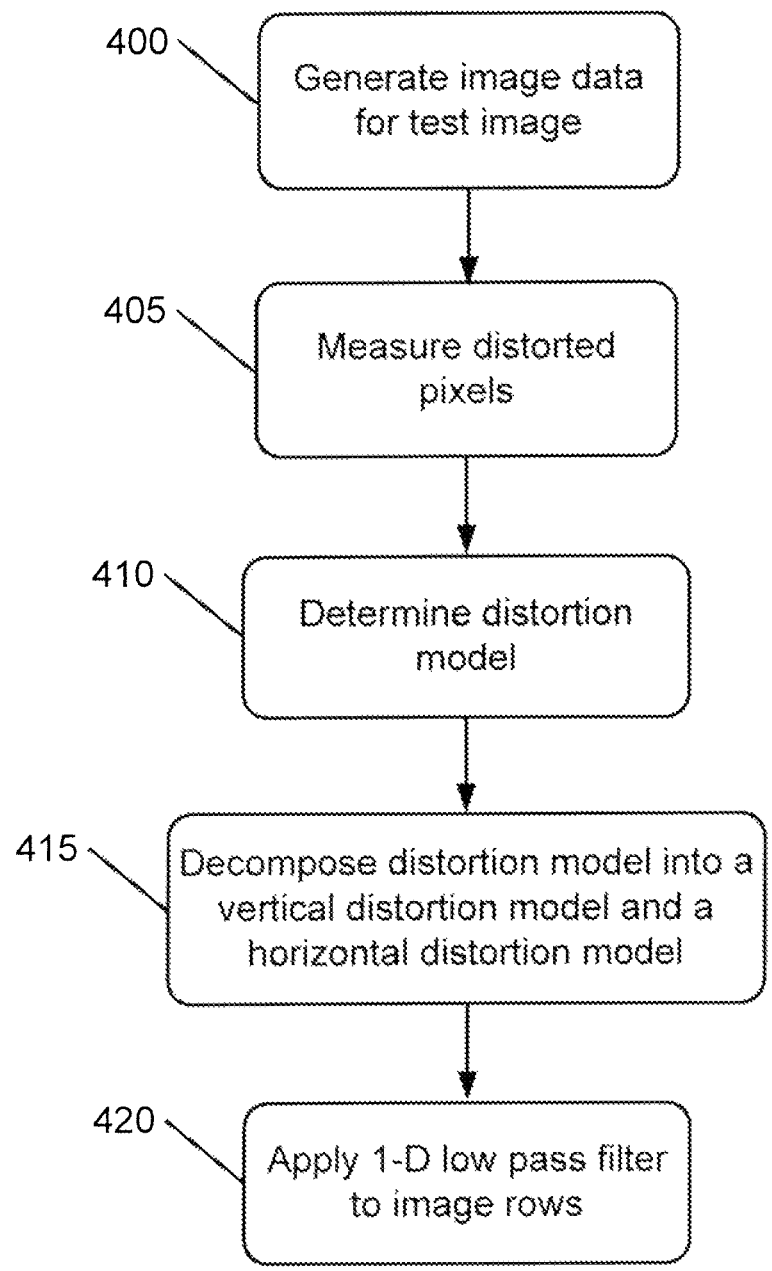
FIG. 4 illustrates a flow chart for generating a distortion model for an optical lens in accordance with an embodiment of the invention.

Referring now to FIG. 4, a flow chart for generating a distortion model for an optical lens in accordance with an embodiment of the invention is described. First, image data is generated for a test image or pattern with a given optical lens (e.g., lens 225) during lens calibration (400). The image data is generated using an image sensor (e.g., image sensor 205) and a standard color filter array (e.g., Bayer or other type). As a result of distortion introduced by the optical lens, pixels in the image data appear distorted, i.e., its coordinates are in error as compared to the actual scene coordinates. The distorted coordinates are then measured (405) to generate the distortion model for the lens (410).

According to an embodiment of the invention, the distortion model is a mathematical function that maps the measured, distorted coordinates into undistorted, corrected pixel coordinates for the original test image. For example, let the coordinate of a given distorted pixel be (x,y). The distorted pixel (x,y) is mapped to a coordinate (x',y') in a corrected image according to the mathematical function. That is, $(x',y') = f(x,y,c)$, where c denotes distortion parameters found during lens calibration. In one embodiment, the mathematical function may be a polynomial function (e.g., a $4^{th}$ or $5^{th}$ order polynomial) generated with any curve fitting routine (e.g., least-squares) implemented by distortion estimation module 235.

The distortion model is then decomposed into a vertical distortion model and a horizontal distortion model (415). The vertical distortion model maps the distorted pixels (x,y) to pixels (x,y') with a vertical distortion function and the horizontal distortion model maps the distorted pixels (x,y') to pixels (x',y') with a horizontal distortion function. The vertical and horizontal distortion functions may also be polynomial functions. Lastly, a 1-D low pass filter is applied to smooth out the pixel mapping (420).

Figure 5:
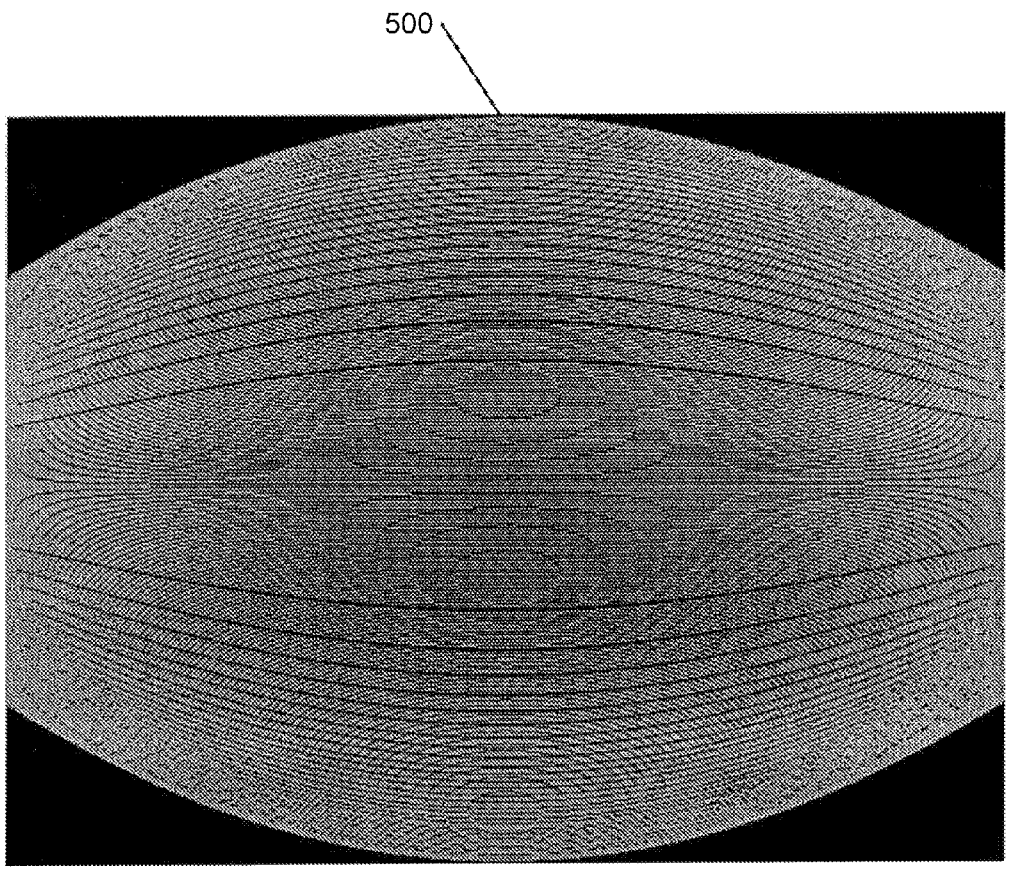
FIG. 5 illustrates an exemplary vertical distortion map for a fisheye lens in accordance with an embodiment of the invention.

FIG. 5 illustrates an exemplary vertical distortion map for a fisheye lens in accordance with an embodiment of the invention. Vertical distortion map 500 shows distorted lines as a result of lens distortion introduced by the Sunex DSL215 lens, developed by Sunex, Inc., of Carlsbad, Calif. As appreciated by one of ordinary skill in the art, vertical distortion map 500 represents distorted positions of pixels of a digital image generated for a test image or pattern of horizontal lines during lens calibration.

According to an embodiment of the invention, vertical distortion map 500 may be used to generate a vertical distortion function to map distorted pixels into undistorted, corrected pixels. This mapping is automatically performed in hardware by customizing the color filter array to follow the vertical distortion function. For example, consider a test image of horizontal lines. After passing through optical lens 225, each horizontal line is distorted (such as in vertical distortion map 500) and bent away or toward the center of the image. When captured by a standard color filter array, the distorted horizontal line has distorted pixel coordinates that are in error as compared to the actual scene coordinates. This error can be compensated and corrected for by adjusting the pixel coordinates of the distorted horizontal line, that is, by customizing or rearranging the color filter array to capture the distorted horizontal line at corrected pixel coordinates.

Figures 6A, 6B, 6C:
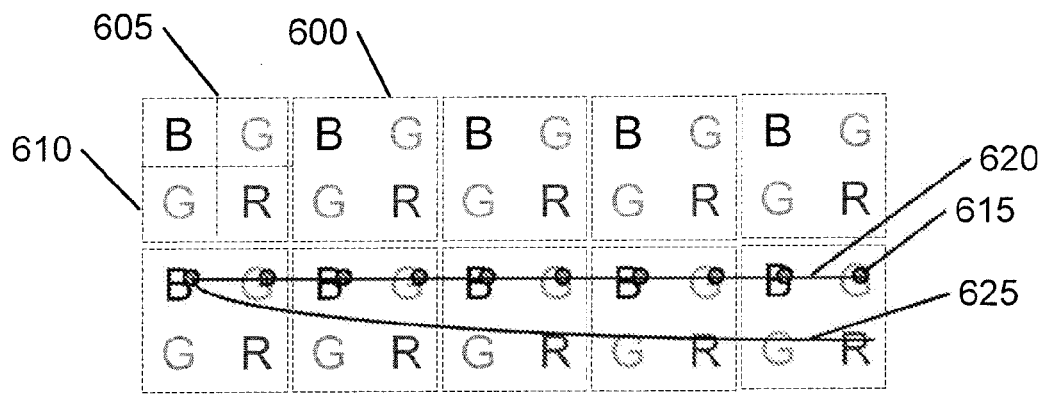
FIG. 6A illustrates a schematic diagram of a standard Bayer color filter array.
FIG. 6B illustrates a schematic diagram of a color filter array having reordered subgroups of pixels in accordance with an embodiment of the invention.
FIG. 6C illustrates a schematic diagram of a customized color filter array according to a vertical distortion model.

A standard color filter array is shown in FIG. 6A. Color filter array 600 has subgroups 605 of pixels 610 arranged in a Bayer pattern. Each subgroup 605 of pixels 610 is arranged in a "B-G-R-G" pattern. A horizontal, undistorted line of "B-G" pixels 615 is captured in color filter array 600 as horizontal line 620. A horizontal, distorted line of "B-G" pixels 615 is captured in color filter array 600 as a distorted line, such as, for example, distorted line 625.

According to an embodiment of the invention, a distorted line such as distorted line 625 may be automatically corrected for by customizing or rearranging color filter array 600. This is accomplished by rearranging one or more subgroups of pixels in the color filter array. For example, color filter array 630 in FIG. 6B has rearranged subgroups 635-640 in which the pixels have been rearranged from a standard Bayer pattern of "B-G-R-G" into a pattern of "G-R-B-G".

A customized color filter array is illustrated in FIG. 6C. Color filter array 645 is customized according to a vertical distortion model to automatically correct for vertical distortion while the pixels are captured by the array. This is accomplished by rerouting the pixels in the array according to the vertical distortion function. In doing so, hardware constraints provide that no pixel shall be connected twice in the vertical distortion function, and that each row should have the same number of pixels. Piece-wise linearization is performed on each column of the vertical distortion map to reroute the pixels according to the vertical distortion function.

Piece-wise linearization scans the columns in the vertical distortion map from left to right. First, some continuous rows are picked from the first column. As appreciated by one of ordinary skill in the art, it is expected that the distribution of the sampled pixels becomes less and less spatially uniform towards the center of the distortion map.

For example, a data set with redundant pixels may appear with coordinates as (1, 2, 2, 3, 3, 4, 5, 6, 7, 8, 9, . . . , 20, 22, 24, . . . , 49, 50, 52, 53, 54, 55, 55, 56), with each coordinate indicating a row in a given column. After piece-wise linearization, the data set is mapped to: (1, 2, (2), 3, (3), 4, 5, 6, 7, 8, 9, . . . , 20 21, 22, 23, 24, . . . , 49, 50, 51, 52, 53, 54, 55, (55), 56), with the underlined pixels representing added pixels and the pixels in parenthesis representing redundant pixels. The mapped pixels are then locally resampled to remove the redundant pixels in parenthesis and insert the underlined interpolated pixels, resulting in a data set of (1, 2, 3, 4, 5, 6, 7, 8, 9, . . . , 20, 21, 22, 23, 24, . . . , 49, 50, 51, 52, 53, 54, 55, 56).

After piece-wise linearization, pixels in the color filter array are then rearranged, for example, pixels 650 are remapped away from a straight horizontal line as line 655 through color filter array 645. This is accomplished by modifying subgroups 660-670 from a standard Bayer pattern of "B-G-G-R" into a pattern of "G-R-B-G" to follow line 655. Doing so ensures that vertical distortion correction is automatically performed in hardware (i.e., with the modified color filter array) every time a new digital image is to be generated.

Figure 7:
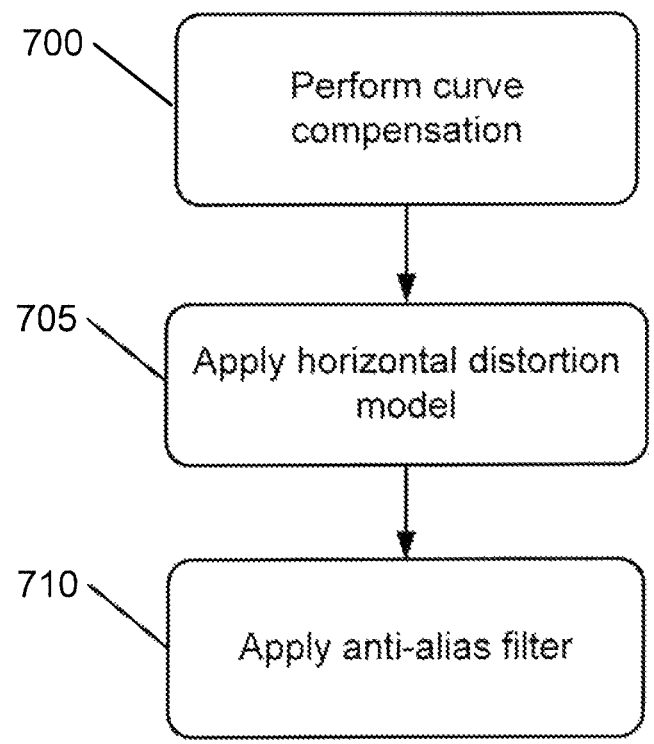
FIG. 7 illustrates a flow chart for applying distortion correction routines to image data to generate a digital image in accordance with an embodiment of the invention.

It is appreciated that image data captured with image sensor 205 and customized color filter array 210 is automatically corrected for vertical distortion but not yet for horizontal distortion. Referring now to FIG. 7, a flow chart for applying distortion correction routines to image data to generate a digital image in accordance with an embodiment of the invention is described. First, curve compensation is applied to the image data to fine-tune the rerouting performed in the customized color filter array 210 (700). This is done to adjust the positioning of pixels that may deviate from the original vertical distortion map, especially in the region far away from the center of the image.

Figure 8:
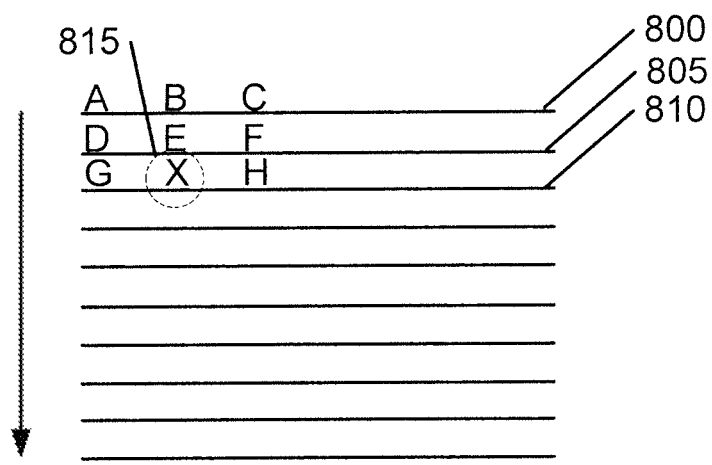
FIG. 8 illustrates a schematic diagram of lines of pixels in a color filter array.

It is appreciated by one of ordinary skill in the art that traditional curve compensation requires line buffers to store the neighborhood of a pixel in order to obtain its exact location in the vertical distortion map. However, because curve compensation may be carried out on line buffers shared with demosaicing routines, no additional line buffers may be required. For example, FIG. 8 shows lines of pixels in a color filter array. Pixel "X" 815 may be calculated as a combination of pixels "A-H" in lines 800-810. The three lines need to be stored at line buffers before pixel 815 may be determined (i.e., three line buffers are needed). By performing curve compensation with the same line buffers used in demosaicing, no additional line buffers are needed.

After curve compensation, horizontal distortion correction is performed according to the horizontal distortion model (705). This is done by mapping the rerouted, curve-compensated pixels to their corrected positions. Here, since only horizontal windowing is applied to map the pixels to their corrected positions, additional line buffers may not be necessary. One of ordinary skill in the art therefore appreciates that automatically performing the vertical distortion correction in hardware with the customized color filter array and performing the horizontal distortion correction in software with distortion correction module 240 in processor 215 significantly reduces or completely eliminates the number of line buffers traditionally required by prior art distortion correction techniques, thereby resulting in considerable savings in power consumption, die size, and overall costs.

Lastly, an anti-alias filter may be applied to the corrected image data to smooth out the edges in the image (710). Depending on the image generated, jagged edges could be observed. Factors contributing to edge artifacts may include sparse sampling of the pixels during piece-wise linearization around the center of the image (which results in reduced vertical resolution) and the discrete nature of the color filter array. There could also be some discrepancy between the observed real value of the pixel and the corrected pixel value estimated with the distortion model, especially in the high frequency of the image.

In some embodiments of the invention, since the vertical resolution is reduced, only the horizontal edges may show artifacts. A horizontal edge detector may be applied to the image, with the degree of filtering depending on both the pixel location and the edge information: stronger edges may get more filtering. Empirically the filtering may increase with image height to the peak at half maximum image height and then decrease to 0 at the corner of the image.

Figure 9A:
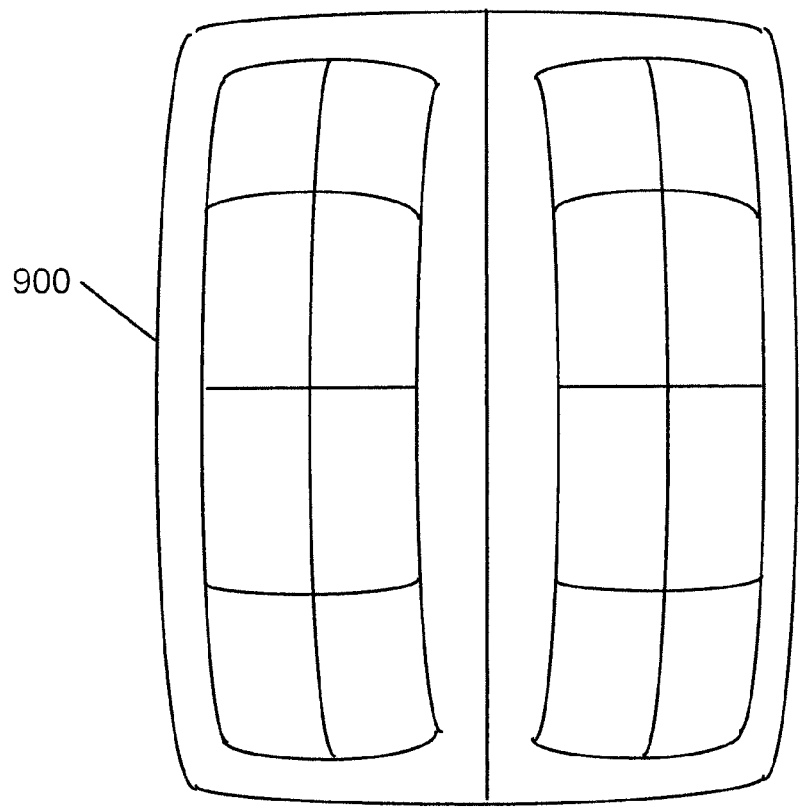
FIG. 9A illustrates a distorted image.
Figure 9B:
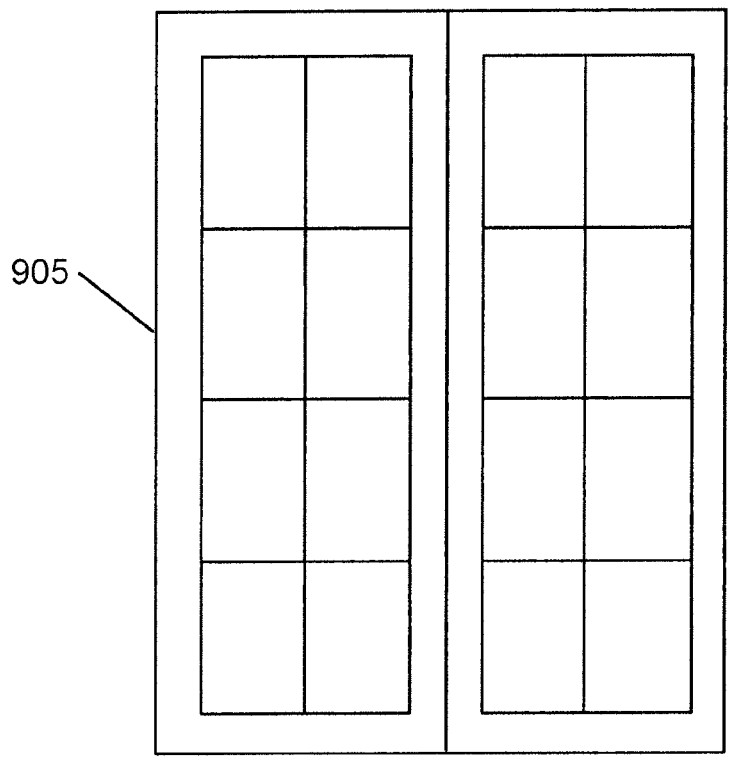
FIG. 9B illustrates the distorted image of FIG. 9A after the distortion correction performed in accordance with an embodiment of the invention.

Application of the anti-alias filter results in an image with smooth, corrected edges, as illustrated in FIG. 9B. Image 905 is an exemplary digital image generated with customized color filter array 210 and processed with distortion correction module 240 in processor 215. Without distortion correction, image 905 may appear distorted as image 900 shown in FIG. 9A.

Advantageously, the image sensor apparatus of the invention enables lens distortion to be corrected at capture time without requiring a large number of line buffers. In contrast to traditional, prior art approaches of lens distortion correction, vertical lens distortion is automatically corrected in hardware using a customized color filter array to follow a vertical distortion map. This significantly reduces or completely eliminates the use of line buffers for correcting for lens distortion in digital images.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. An image sensor apparatus, comprising:
    an image sensor for generating image data based upon at least a color filter array and corresponding to an optical image;
    the color filter array comprising subgroups of pixels rearranged from a standard Bayer color filter array according to a vertical distortion module such that the color filter array is customized for a lens distortion model, the lens distortion model comprising the vertical distortion model and a horizontal distortion model; and
    a processor for processing the image data with a plurality of distortion correction routines to generate a digital image.

2. The image sensor apparatus of claim 1, wherein the vertical distortion model and the horizontal distortion model comprise a polynomial function with a plurality of coefficients.

3. The image sensor apparatus of claim 2, wherein the processor comprises a distortion estimation routine for estimating the plurality of coefficients.

4. The image sensor apparatus of claim 1, wherein the plurality of distortion correction routines comprises a curve compensation routine to adjust vertical coordinates of the image data.

5. The image sensor apparatus of claim 1, wherein the plurality of distortion correction routines comprises a horizontal distortion correction routine to correct horizontal coordinates of the image data according to the horizontal distortion model and generate corrected image data.

6. The image sensor apparatus of claim 1, wherein the plurality of distortion correction routines comprises an anti-alias filtering routine to smooth edges in the corrected image data.

7. The image sensor apparatus of claim 1, further comprising a lens associated with the lens distortion model.

8. The image sensor apparatus of claim 7, wherein the lens is selected from the group comprising an ultra-wide angle lens, a fisheye lens, a telephoto lens, a retrofocus lens, and a large-angle zoom lens.

9. A method for correcting lens distortion in a digital image, the method comprising:
- generating a distortion model including a horizontal distortion model and a vertical distortion model for an optical lens;
- designing a color filter array according to the distortion model by modifying a standard Bayer color filter array;
- acquiring image data with an image sensor apparatus having the designed color filter array; and
- applying a plurality of distortion correction routines to the image data to generate a digital image;
- wherein the step of modifying a standard Bayer color filter array comprises rearranging one or more subgroups of pixels in the standard Bayer color filter array to follow the vertical distortion model.

10. The method of claim 9, wherein generating a distortion model for an optical lens comprises generating image data for a test image using an image sensor apparatus having the standard Bayer color filter array.

11. The method of claim 9, wherein rearranging one or more subgroup of pixels in the standard Bayer color filter array comprises applying piece-wise linearization to approximate the vertical distortion model on the standard Bayer color filter array.

12. The method of claim 9, wherein applying a plurality of distortion correction routines to the image data comprises applying a curve compensation routine to adjust vertical coordinates of the image data.

13. The method of claim 9, wherein applying a plurality of distortion correction routines to the image data comprises applying a horizontal distortion correction routine to correct horizontal coordinates of the image data according to the horizontal distortion model and generate corrected image data.

14. The method of claim 13, wherein applying a plurality of distortion correction routines to the image data comprises applying an anti-alias filtering routine to the corrected image data.

15. A processor for use in an image sensor apparatus having a color filter array associated with a readout data path, comprising:
- a distortion estimation module for generating a lens distortion model for an optical lens, the lens distortion model comprising a vertical distortion model and a horizontal distortion model; and
- a distortion correction module for correcting for horizontal lens distortion according to the horizontal distortion model,
- wherein the color filter array and the readout data path are customized by modifying a standard Bayer color filter array according to the vertical distortion model.

16. The processor of claim 15, further comprising a curve approximation module to approximate the vertical distortion model for the color filter array using piece-wise linearization.

* * * * *